(12) United States Patent
Pedrozo et al.

(10) Patent No.: US 7,354,627 B2
(45) Date of Patent: Apr. 8, 2008

(54) METHOD FOR ORGANIZING THE ASSEMBLY OF COLLAGEN FIBERS AND COMPOSITIONS FORMED THEREFROM

(75) Inventors: Hugo A. Pedrozo, Silver Lake, IN (US); Mark Shuster, Toledo, OH (US)

(73) Assignee: DePuy Products, Inc., Warsaw, IN (US)

( * ) Notice: Subject to any disclaimer, the term of this patent is extended or adjusted under 35 U.S.C. 154(b) by 258 days.

(21) Appl. No.: 11/022,467

(22) Filed: Dec. 22, 2004

(65) Prior Publication Data
US 2006/0135638 A1 Jun. 22, 2006

(51) Int. Cl.
C07K 1/107 (2006.01)
C08F 2/52 (2006.01)
C08F 2/58 (2006.01)

(52) U.S. Cl. .................. 427/487; 427/458; 527/200
(58) Field of Classification Search ............ 427/458; 527/200
See application file for complete search history.

(56) References Cited

U.S. PATENT DOCUMENTS

| | | | |
|---|---|---|---|
| 3,272,204 A | 9/1966 | Artandi et al. | |
| 3,562,820 A | 2/1971 | Braun | |
| 4,105,034 A | 8/1978 | Shalaby et al. | |
| 4,130,639 A | 12/1978 | Shalaby et al. | |
| 4,140,678 A | 2/1979 | Shalaby et al. | |
| 4,141,087 A | 2/1979 | Shalaby et al. | |
| 4,205,399 A | 6/1980 | Shalaby et al. | |
| 4,208,511 A | 6/1980 | Shalaby et al. | |
| 4,352,463 A | 10/1982 | Baker | |
| 4,400,833 A | 8/1983 | Kurland | |
| 4,418,691 A | 12/1983 | Yannas et al. | |
| 4,585,458 A | 4/1986 | Kurland | |
| 4,610,397 A | 9/1986 | Fischer et al. | |
| 4,642,120 A | 2/1987 | Nevo et al. | |
| 4,669,473 A | 6/1987 | Richards et al. | |
| 4,703,108 A | 10/1987 | Silver et al. | |
| 4,705,040 A | 11/1987 | Mueller et al. | |
| 4,728,591 A * | 3/1988 | Clark et al. ............ 430/5 |
| 4,741,330 A | 5/1988 | Hayhurst | |
| 4,750,492 A | 6/1988 | Jacobs | |
| 4,846,835 A | 7/1989 | Grande | |
| 4,873,976 A | 10/1989 | Schreiber | |
| 4,880,429 A | 11/1989 | Stone | |

(Continued)

FOREIGN PATENT DOCUMENTS

EP    0 446 105 A2    1/1992

(Continued)

OTHER PUBLICATIONS

Hodde and Hiles, "Bioactive FGF-2 in sterilized extracellular matrix", Wounds, 13(5): 195-201 (2001).

(Continued)

Primary Examiner—Susan Berman
(74) Attorney, Agent, or Firm—Barnes & Thornburg LLP

(57) ABSTRACT

The present invention provides a protein polymer material and a method for preparing the protein polymer material involving applying an energy such as electrical energy or gravitational energy to a protein to cause the protein to assemble in a controlled arrangement. The protein used in this method may be any suitable fibrillar protein capable of self-assembling.

14 Claims, 2 Drawing Sheets

U.S. PATENT DOCUMENTS

| | | | |
|---|---|---|---|
| 4,902,508 A | 2/1990 | Badylak et al. | |
| 4,919,667 A | 4/1990 | Richmond | |
| 4,956,178 A | 9/1990 | Badylak et al. | |
| 4,956,179 A | 9/1990 | Bamberg et al. | |
| 4,976,715 A | 12/1990 | Bays et al. | |
| 5,007,934 A | 4/1991 | Stone | |
| 5,061,286 A | 10/1991 | Lyle | |
| 5,102,421 A | 4/1992 | Anspach, Jr. | |
| 5,108,438 A | 4/1992 | Stone | |
| 5,128,326 A | 7/1992 | Balazs et al. | |
| RE34,021 E | 8/1992 | Mueller et al. | |
| 5,236,431 A | 8/1993 | Gogolewski et al. | |
| 5,246,441 A | 9/1993 | Ross et al. | |
| 5,258,015 A | 11/1993 | Li et al. | |
| 5,269,809 A | 12/1993 | Hayhurst et al. | |
| 5,275,826 A | 1/1994 | Badylak et al. | |
| 5,281,422 A | 1/1994 | Badylak et al. | |
| 5,306,311 A | 4/1994 | Stone et al. | |
| 5,320,633 A | 6/1994 | Allen et al. | |
| 5,329,846 A | 7/1994 | Bonutti | |
| 5,350,583 A | 9/1994 | Yoshizato et al. | |
| 5,352,463 A | 10/1994 | Badylak et al. | |
| 5,372,821 A | 12/1994 | Badylak et al. | |
| 5,374,268 A | 12/1994 | Sander | |
| 5,376,118 A | 12/1994 | Kaplan et al. | |
| 5,380,334 A | 1/1995 | Torrie et al. | |
| 5,445,833 A | 8/1995 | Badylak et al. | |
| 5,447,940 A | 9/1995 | Harvey et al. | |
| 5,460,962 A | 10/1995 | Kemp | |
| 5,464,929 A | 11/1995 | Bezwada et al. | |
| 5,479,033 A | 12/1995 | Baca et al. | |
| 5,514,181 A | 5/1996 | Light et al. | |
| 5,516,533 A | 5/1996 | Badylak et al. | |
| 5,520,691 A | 5/1996 | Branch | |
| 5,545,178 A | 8/1996 | Kensey | |
| 5,554,389 A | 9/1996 | Badylak et al. | |
| 5,569,252 A | 10/1996 | Justin et al. | |
| 5,573,784 A | 11/1996 | Badylak et al. | |
| 5,591,234 A | 1/1997 | Kirsch | |
| 5,593,441 A | 1/1997 | Lichtenstein et al. | |
| 5,595,621 A | 1/1997 | Light et al. | |
| 5,595,751 A | 1/1997 | Bezwada et al. | |
| 5,597,579 A | 1/1997 | Bezwada et al. | |
| 5,601,558 A | 2/1997 | Torrie et al. | |
| 5,607,687 A | 3/1997 | Bezwada et al. | |
| 5,618,552 A | 4/1997 | Bezwada et al. | |
| 5,620,698 A | 4/1997 | Bezwada et al. | |
| 5,626,614 A | 5/1997 | Hart | |
| 5,630,824 A | 5/1997 | Hart | |
| 5,632,745 A | 5/1997 | Schwartz | |
| 5,641,518 A | 6/1997 | Badylak et al. | |
| 5,645,850 A | 7/1997 | Bezwada et al. | |
| 5,645,860 A | 7/1997 | Knapp, Jr. et al. | |
| 5,648,088 A | 7/1997 | Bezwada et al. | |
| 5,660,225 A | 8/1997 | Saffran | |
| 5,668,288 A | 9/1997 | Storey et al. | |
| 5,669,912 A | 9/1997 | Spetzler | |
| 5,677,355 A | 10/1997 | Shalaby et al. | |
| 5,681,353 A | 10/1997 | Li et al. | |
| 5,693,085 A * | 12/1997 | Buirge et al. | 623/1.13 |
| 5,695,998 A | 12/1997 | Badylak et al. | |
| 5,698,213 A | 12/1997 | Jamiolkowski et al. | |
| 5,700,583 A | 12/1997 | Jamiolkowski et al. | |
| 5,702,462 A | 12/1997 | Oberlander | |
| 5,711,960 A | 1/1998 | Shikinami | |
| 5,711,969 A | 1/1998 | Patel et al. | |
| 5,725,556 A | 3/1998 | Moser et al. | |
| 5,730,933 A | 3/1998 | Peterson | |
| 5,733,337 A | 3/1998 | Carr, Jr. et al. | |
| 5,733,868 A | 3/1998 | Peterson et al. | |
| 5,735,897 A | 4/1998 | Buirge | |
| 5,735,903 A | 4/1998 | Li et al. | |
| 5,736,372 A | 4/1998 | Vacanti et al. | |
| 5,753,267 A | 5/1998 | Badylak et al. | |
| 5,755,791 A | 5/1998 | Whitson et al. | |
| 5,759,190 A | 6/1998 | Vibe-Hansen et al. | |
| 5,759,205 A | 6/1998 | Valentini | |
| 5,762,600 A | 6/1998 | Bruchman et al. | |
| 5,762,966 A | 6/1998 | Knapp et al. | |
| 5,769,899 A | 6/1998 | Schwartz et al. | |
| 5,773,577 A | 6/1998 | Cappello | |
| 5,788,625 A | 8/1998 | Plouhar et al. | |
| 5,795,353 A | 8/1998 | Felt | |
| 5,800,537 A | 9/1998 | Bell | |
| 5,830,708 A | 11/1998 | Naughton | |
| 5,834,232 A | 11/1998 | Bishop et al. | |
| 5,842,477 A | 12/1998 | Naughton et al. | |
| 5,847,012 A | 12/1998 | Shalaby et al. | |
| 5,855,610 A | 1/1999 | Vacanti et al. | |
| 5,855,613 A | 1/1999 | Antanavich et al. | |
| 5,855,619 A | 1/1999 | Caplan et al. | |
| 5,859,150 A | 1/1999 | Jamiolkowski et al. | |
| 5,861,004 A | 1/1999 | Kensey et al. | |
| 5,863,551 A | 1/1999 | Woerly | |
| 5,866,165 A | 2/1999 | Liu | |
| 5,866,414 A | 2/1999 | Badylak et al. | |
| 5,885,619 A | 3/1999 | Patel et al. | |
| 5,891,558 A | 4/1999 | Bell et al. | |
| 5,899,939 A | 5/1999 | Boyce et al. | |
| 5,906,997 A | 5/1999 | Schwartz et al. | |
| 5,916,265 A | 6/1999 | Hu | |
| 5,922,028 A | 7/1999 | Plouhar et al. | |
| 5,939,323 A | 8/1999 | Valentini et al. | |
| 5,954,723 A | 9/1999 | Spetzler | |
| 5,954,747 A | 9/1999 | Clark | |
| 5,955,100 A | 9/1999 | Bosslet et al. | |
| 5,958,874 A | 9/1999 | Clark et al. | |
| 5,968,096 A | 10/1999 | Whitson et al. | |
| 5,971,987 A | 10/1999 | Huxel et al. | |
| 5,980,524 A | 11/1999 | Justin et al. | |
| 5,981,802 A | 11/1999 | Katz | |
| 5,981,825 A | 11/1999 | Brekke | |
| 5,989,269 A | 11/1999 | Vibe-Hansen et al. | |
| 5,989,280 A | 11/1999 | Euteneuer et al. | |
| 5,993,475 A | 11/1999 | Lin et al. | |
| 5,993,844 A | 11/1999 | Abraham et al. | |
| 5,997,575 A | 12/1999 | Whitson et al. | |
| 6,010,525 A | 1/2000 | Bonutti et al. | |
| 6,017,301 A | 1/2000 | Schwartz et al. | |
| 6,017,348 A | 1/2000 | Hart et al. | |
| 6,027,744 A | 2/2000 | Vacanti et al. | |
| 6,034,140 A | 3/2000 | Schwartz et al. | |
| 6,042,610 A | 3/2000 | Li et al. | |
| 6,051,750 A | 4/2000 | Bell | |
| 6,056,752 A | 5/2000 | Roger | |
| 6,056,777 A | 5/2000 | McDowell | |
| 6,056,778 A | 5/2000 | Grafton et al. | |
| 6,060,640 A | 5/2000 | Pauley et al. | |
| 6,066,160 A | 5/2000 | Colvin et al. | |
| 6,068,648 A | 5/2000 | Cole et al. | |
| 6,077,989 A | 6/2000 | Kandel et al. | |
| 6,080,194 A | 6/2000 | Pachence et al. | |
| 6,093,201 A | 7/2000 | Cooper et al. | |
| 6,098,347 A | 8/2000 | Jaeger et al. | |
| 6,099,567 A | 8/2000 | Badylak et al. | |
| 6,110,212 A | 8/2000 | Gregory | |
| 6,126,686 A | 10/2000 | Badylak et al. | |
| 6,133,325 A | 10/2000 | Schwartz et al. | |
| 6,146,385 A | 11/2000 | Torrie et al. | |
| 6,152,935 A | 11/2000 | Kammerer et al. | |
| 6,153,292 A | 11/2000 | Bell et al. | |
| 6,156,044 A | 12/2000 | Kammerer et al. | |
| 6,165,225 A | 12/2000 | Antanavich et al. | |
| 6,171,344 B1 | 1/2001 | Atala | |

| | | |
|---|---|---|
| 6,176,880 B1 | 1/2001 | Plouhar et al. |
| 6,179,840 B1 | 1/2001 | Bowman |
| 6,179,872 B1 | 1/2001 | Bell et al. |
| 6,187,039 B1 | 2/2001 | Hiles et al. |
| 6,197,296 B1 | 3/2001 | Davies et al. |
| 6,206,931 B1 | 3/2001 | Cook et al. |
| 6,214,048 B1 | 4/2001 | Ito et al. |
| 6,214,049 B1 | 4/2001 | Gayer et al. |
| 6,224,892 B1 | 5/2001 | Searle |
| 6,235,057 B1 | 5/2001 | Roger et al. |
| 6,242,247 B1 | 6/2001 | Rieser et al. |
| 6,251,143 B1 | 6/2001 | Schwartz et al. |
| 6,251,876 B1 | 6/2001 | Bellini et al. |
| 6,258,124 B1 | 7/2001 | Darois et al. |
| 6,264,702 B1 | 7/2001 | Ory et al. |
| 6,265,333 B1 | 7/2001 | Dzenis et al. |
| 6,267,957 B1 | 7/2001 | Green et al. |
| 6,270,530 B1 | 8/2001 | Eldridge et al. |
| 6,273,893 B1 | 8/2001 | McAllen, III et al. |
| 6,280,473 B1 | 8/2001 | Lemperle et al. |
| 6,280,474 B1 | 8/2001 | Cassidy et al. |
| 6,283,980 B1 | 9/2001 | Vibe-Hansen et al. |
| 6,288,043 B1 | 9/2001 | Spiro et al. |
| 6,290,711 B1 | 9/2001 | Caspari et al. |
| 6,293,961 B2 | 9/2001 | Schwartz et al. |
| 6,294,041 B1 | 9/2001 | Boyce et al. |
| 6,299,905 B1 | 10/2001 | Peterson et al. |
| 6,306,156 B1 | 10/2001 | Clark |
| 6,306,159 B1 | 10/2001 | Schwartz et al. |
| 6,306,177 B1 | 10/2001 | Felt et al. |
| 6,319,258 B1 | 11/2001 | McAllen, III et al. |
| 6,319,271 B1 | 11/2001 | Schwartz et al. |
| 6,326,025 B1 | 12/2001 | Sigler et al. |
| 6,333,029 B1 | 12/2001 | Vyakarnam et al. |
| 6,334,872 B1 | 1/2002 | Termin et al. |
| 6,355,699 B1 | 3/2002 | Vyakarnam et al. |
| 6,358,284 B1 | 3/2002 | Fearnot et al. |
| 6,364,884 B1 | 4/2002 | Bowman et al. |
| 6,371,958 B1 | 4/2002 | Overaker |
| 6,373,221 B1 | 4/2002 | Koike et al. |
| 6,379,367 B1 | 4/2002 | Vibe-Hansen et al. |
| 6,379,710 B1 | 4/2002 | Badylak |
| 6,383,221 B1 | 5/2002 | Scarborough et al. |
| 6,387,693 B2 | 5/2002 | Rieser et al. |
| 6,402,766 B2 | 6/2002 | Bowman et al. |
| 6,409,764 B1 | 6/2002 | White et al. |
| 6,423,073 B2 | 7/2002 | Bowman |
| 6,436,110 B2 | 8/2002 | Bowman et al. |
| 6,440,444 B2 | 8/2002 | Boyce et al. |
| 6,447,517 B1 | 9/2002 | Bowman |
| 6,451,032 B1 | 9/2002 | Ory et al. |
| 6,458,158 B1 | 10/2002 | Anderson et al. |
| 6,458,383 B2 | 10/2002 | Chen et al. |
| 6,464,729 B1 | 10/2002 | Kandel |
| 6,497,650 B1 | 12/2002 | Nicolo |
| 6,497,707 B1 | 12/2002 | Bowman et al. |
| 6,508,821 B1 | 1/2003 | Schwartz et al. |
| 6,517,564 B1 | 2/2003 | Grafton et al. |
| 6,566,345 B2 | 5/2003 | Miller et al. |
| 6,572,650 B1 | 6/2003 | Abraham et al. |
| 6,592,623 B1 * | 7/2003 | Bowlin et al. ........... 623/14.13 |
| 6,596,296 B1 | 7/2003 | Nelson et al. |
| 6,638,312 B2 | 10/2003 | Plouhar et al. |
| 6,652,872 B2 | 11/2003 | Nevo et al. |
| 6,666,892 B2 | 12/2003 | Hiles et al. |
| 6,692,499 B2 | 2/2004 | Törmäläet et al. |
| 6,812,221 B2 | 11/2004 | McKeehan et al. |
| 6,840,962 B1 | 1/2005 | Vacanti et al. |
| 6,869,938 B1 | 3/2005 | Schwartz et al. |
| 6,989,034 B2 | 1/2006 | Hammer et al. |
| 2001/0002446 A1 | 5/2001 | Plouhar et al. |
| 2001/0023373 A1 | 9/2001 | Plouhar et al. |
| 2001/0024658 A1 | 9/2001 | Chen et al. |

| | | |
|---|---|---|
| 2001/0043943 A1 | 11/2001 | Coffey |
| 2002/0019649 A1 | 2/2002 | Sikora et al. |
| 2002/0031551 A1 | 3/2002 | Peterson et al. |
| 2002/0034533 A1 | 3/2002 | Peterson et al. |
| 2002/0038151 A1 | 3/2002 | Plouhar et al. |
| 2002/0048595 A1 | 4/2002 | Geistlich et al. |
| 2002/0052628 A1 | 5/2002 | Bowman |
| 2002/0090725 A1 * | 7/2002 | Simpson et al. ............ 435/402 |
| 2002/0091444 A1 | 7/2002 | Yan |
| 2002/0095157 A1 | 7/2002 | Bowman |
| 2002/0099448 A1 | 7/2002 | Hiles |
| 2002/0131989 A1 | 9/2002 | Brown et al. |
| 2002/0165611 A1 | 11/2002 | Enzerink et al. |
| 2002/0169465 A1 | 11/2002 | Bowman et al. |
| 2002/0173806 A1 | 11/2002 | Giannetti et al. |
| 2003/0014126 A1 | 1/2003 | Patel et al. |
| 2003/0021827 A1 | 1/2003 | Malaviya et al. |
| 2003/0023316 A1 | 1/2003 | Brown et al. |
| 2003/0032961 A1 | 2/2003 | Pelo et al. |
| 2003/0033021 A1 | 2/2003 | Plouhar et al. |
| 2003/0033022 A1 | 2/2003 | Plouhar et al. |
| 2003/0036797 A1 | 2/2003 | Malaviya et al. |
| 2003/0036801 A1 | 2/2003 | Schwartz et al. |
| 2003/0044444 A1 | 3/2003 | Malaviya et al. |
| 2003/0049299 A1 | 3/2003 | Malaviya et al. |
| 2003/0078617 A1 | 4/2003 | Schwartz et al. |
| 2003/0212447 A1 | 11/2003 | Euteneuer et al. |
| 2004/0059431 A1 | 3/2004 | Plouhar et al. |
| 2004/0143344 A1 | 7/2004 | Malaviya et al. |
| 2004/0166169 A1 | 8/2004 | Malaviya et al. |
| 2004/0220574 A1 | 11/2004 | Pelo et al. |
| 2005/0027307 A1 | 2/2005 | Schwartz et al. |
| 2005/0249771 A1 | 11/2005 | Malaviya et al. |
| 2005/0249772 A1 | 11/2005 | Malaviya et al. |

FOREIGN PATENT DOCUMENTS

| | | |
|---|---|---|
| EP | 0591 991 A2 | 4/1994 |
| EP | 0632999 A1 | 11/1995 |
| EP | 0 734 736 A1 | 10/1996 |
| EP | 1070487 | 1/2001 |
| EP | 1593400 A1 | 11/2005 |
| GB | 2 215 209 | 9/1989 |
| JP | 11319068 A | 11/1999 |
| WO | WO 90/09769 | 9/1990 |
| WO | WO 94/11008 | 5/1994 |
| WO | WO 95/05083 | 2/1995 |
| WO | WO 95/22301 | 8/1995 |
| WO | WO 95/06439 | 9/1995 |
| WO | WO 95/32623 | 12/1995 |
| WO | WO96/24304 | 8/1996 |
| WO | WO 96/24661 | 8/1996 |
| WO | WO 97/05193 | 2/1997 |
| WO | WO 97/37613 | 10/1997 |
| WO | WO 98/06445 | 2/1998 |
| WO | WO 98/22158 A2 | 5/1998 |
| WO | WO 98/22158 A3 | 5/1998 |
| WO | WO 98/30167 | 7/1998 |
| WO | WO 98/34569 | 8/1998 |
| WO | WO 98/40111 | 9/1998 |
| WO | WO 99/03979 | 1/1999 |
| WO | WO 99/43786 | 9/1999 |
| WO | WO 99/47188 | 9/1999 |
| WO | WO 00/15765 | 3/2000 |
| WO | WO 00/16822 | 3/2000 |
| WO | WO 00/24437 A2 | 5/2000 |
| WO | WO 00/24437 A3 | 5/2000 |
| WO | WO 00/32250 | 6/2000 |
| WO | WO 00/48550 | 8/2000 |
| WO | WO 00/72782 | 12/2000 |
| WO | WO 01/19423 | 3/2001 |
| WO | WO 01/39694 A2 | 6/2001 |
| WO | WO 01/39694 A3 | 6/2001 |

| | | |
|---|---|---|
| WO | WO 01/45765 | 6/2001 |
| WO | WO 01/66159 | 9/2001 |
| WO | WO 02/22184 | 3/2002 |
| WO | WO 03/07784 | 1/2003 |
| WO | WO 03/007788 A2 | 1/2003 |
| WO | WO 03/007790 A2 | 1/2003 |

OTHER PUBLICATIONS

O'Meara, Patrick, "The basic science of meniscus repair," Orthopaedic review, Jun. 1993, pp. 681-686.

Clearfix screw advertisement, 1998, Innovasive devices, Inc.

Winters and Justin, "Clearfix meniscal screw", Innovasive devices, Inc. 1998.

Surgical dynamics, meniscal stapler advertisement, 1997.

Bionix implants, Meniscus arrow advertisement, 1996.

Instrument makar, inc., Meniscus mender II, 1989.

William G. Clancy, Jr., M.D., and Ben K. Graf, M.D., "Arthroscopic Meniscal Repair," ACUFEX Microsurgical Inc., advertisement, 1988.

P. K. Chu et al., "Plasma-surface modification of biomaterials", Materials Science and Engineering, Reports: A Review Journal, vol. 36, No. 5-6, Mar. 29, 2002, pp. 143-206.

Arnoczky et al., The microvasculature of the meniscus and its response to injury—An experimental study in the dog, *Am. J. Sports Med.*, 1983, 11(3); pp. 131-141.

Fox et al., Trephination of incomplete meniscal tears, *Arthroscopy*, 1993, 9(4); pp. 451-455.

Arnoczky et al., Meniscal repair using an exogenous fibrin clot—An experimental study of dogs, *J. Bone Joint Surg. Am.*, 1988, 70(8), pp. 1209-1216.

Rodeo, "Arthroscopic meniscal repair with use of the outside-in technique", *Instr. Course Lect.*, 2000, 49, pp. 195-206.

Stollsteimer et al., "Meniscal allograft transplantation: a 1- to 5-year follow-up of 22 patients", *Arthroscopy*, 2000, 16(4), pp. 343-347.

Rodeo, "Meniscal allografts—where do we stand?", *Am. J. Sports Med.*, 2001, 29(2), pp. 246-261.

Sweigart et al., "Toward tissue engineering of the knee meniscus", *Tissue Eng.*, 2001, 7(2), pp. 111-129.

Boss et al., "Technical innovative: creation of a peripheral vascularized trough to enhance healing in cryopreserved meniscal allograft reconstruction", *Knee Surg Sports Traumatol Arthrosc.*, 2000, 8(3), pp. 159-162.

J.S. Pieper et al "Preparation and characterization of porous crosslinked collagenous matrices containing bioavailable chondroitin sulphate" Biomaterials 1999, 20: 847-858.

P.B. van Wachem et al. "In vivo biocompatability of carbodiimide-crosslinked collagen matrices: Effects of crosslink density, heparin immobilization, and bFGF loading" J. Biomed. Mater. Res. 2001, 55 (3): 368-378.

Kyumin Whang "A biodegradable polymer scaffold for delivery of osteotropic factors" Biomaterials 2000, 21 (24): 2545-2551.

J.S. Pieper et al. Attachment of glycosaminoglycans to collagenous matrices modulates the tissue response in rats, Biomaterials 2000, 21 (16): 1689-1699.

Kristen Billiar et al. "Effects of carbodiimide crosslinking conditions on the physical properties of laminated intestinal submucosa", J. Biomed. Mater. Res. 2001, 51(1): 101-108.

Toshimitsu Momose et al. "Surface modification of extrasynovial tendon by chemically modified hyaluronic acid coating" J. Biomed. Mater. Res. 2002, 59: 219-224.

Handbook of Biodegradable Polymers Hardwood Press 1997 (251-272).

Cohn et al., "Biodegradable PEO/PLA block copolymers," Journal of Biomedical Materials Research, 1988, 22 (993-1009).

"Polymer Preprints" (ACS Division of Polymer Chemistry), 1989. 30(1): 498.

The Encyclopedia of Polymer Science, 1988 (13) 31-41.

"Handbook of Biodegradable Polymers" Hardwood Press 1977 (161-182).

"Handbook of Biodegradable Polymers" Hardwood Press 1997 (99-118).

DiSilvestro et al., "Effects of Cross-Linking on the Mechanical Properties of a Porous Foam Scaffold of Small Intestine Submucosa", Society for Biomaterials 29th Annual Meeting Transactions, 2003, pp. 88.

Ide et al., "Collagen Hybridization with Poly(I-Lactic Acid) Braid Promotes Ligament Cell Migration", Mater. Sci. Eng. C, 17(1-2), 95-99 (2001).

Bercovy et al., "Carbon-PGLA Prosthesis for Ligament Reconstruction Experimental Basis and Short Term Results in Man", Clin. Orthop. Relat. Res., (196), 159-68 (1985).

Zhu et al, "Immobilization of Biomacromolecules onto Aminolyzed Poly(L-lactic acid) toward Acceleration of Endothelium Regeneration", Tissue Engineering, v 10, pp. 53-61, 2004.

Cheng & Teoh, "Surface modification of ultra thin poly (ÿ caprolactone) films using acrylic acid and collagen", Biomaterials, v25(11), pp. 1991-2001, 2004.

Wan et al., "Cell adhesion on gaseous plasma modifiied poly-(L-lactide) surface under shear stress field", Biomaterials, v24(21), pp. 3757-3764, 2003.

Yang et al., "Effect of surface treatment on the biocompatibility of microbial polyhydroxyalkanoates", Biomaterials, v 23 (5), pp. 1391-1397, 2002.

Croll et al., "Controllable surface modification of Poly(lactic-co-glycolic acid) (PLGA) by hydrolysis or aminolysis I: physical, chemical, and theoretical aspects", Biomacromolecules, Mar.-Apr. 2004, 5(2): 463-473.

Kwon et al., "Fibroblast culture on surface-modified poly (glycolide-co- ÿ-caprolactone) scaffoid for soft tissue regeneration", J. Biomater Sci Polym ed. 2001, 12(10) 1147-60.

Gastel JA, Muirhead WR, Lifrak JT, Fadale PD, Hulstyn MJ, Labrador DP "Meniscal tissue regeneration using a collagenous biomaterial derived from porcine small intestine submucosa", Arthroscopy, Feb. 17(2): 151-159.

Tan W, Krishnaraj R, Desai TA "Evaluation of nanostructural composite collagen-chitosan matrices for tissue engineering", Tissue Eng Apr; 7(2): 203-210, 2001.

Arnoczky SP "Building a meniscus", Biological considerations, Clin Orthop Oct. 367 (suppl), S244-53, 1999.

Metcalf et al., "Surgical technique for xenograft (SIS) augmentation of rotator-cuff repairs", Op Tech Orthop, 12(3): 204-208, 2002.

Courtney et al., "Modification of polymer surface: optimization of approaches", Perfusion, v 18(11), pp. 33-39, 2003.

Zhang et al., Design of nanostructural biological materials through self-assembly of peptides and proteins, MIT Current Opinion in chemical Biology, 2002, 6:865-871.

European Search Report for European Application No. 05257903. 4-2115, Jun. 14, 2006, 3 pgs.

Fan et al., "A composite coating by electrolysis-induced collagen self-assembly and calcium phosphate mineralization", *Biomaterials, Elsevier Science Publishers BV*, XP004670973, vol. 26, No. 14, May 14, 2005, pp. 1623-1632.

Marino et al., "The effect of electric current on rat tail tendon collagen in solution", *Calcified Tissue Research*, XP009066270, vol. 4, No. 4, 1970, pp. 330-338.

Marino et al., "Piezoelectricity in collagen films", *Calcified Tissue International*, XP009066271, vol. 31, No. 3, 1980, pp. 257-259.

Miller et al., "Electric field-assisted assembly of type-I collagen for applications in biomedical micro-systems", *Proceedings of IMECE 2005, 2005 ASME Int'l Mech. Engr. Cong. and Expo.*, XP009065904, Nov. 2005, pp. 1-3.

Niyibizi et al., "Human Placenta Type V Collagens Evidence for the Existence of an Alpha-1-V-Alpha-2-V-Alpha-3-V Collagen Molecule", *Journal of Biological Chemistry*, XP002380121, vol. 259, No. 22, 1984, pp. 14170-14174.

Ma et al., "Synthetic nano-scale fibrous extracellular matrix", *Journal Biomedical Materials Research*, XP002380122, vol. 46, No. 1, 1999, pp. 60-72.

Definitions of "intertwine" and "twine", *American Heritage Dictionary of the English Language Online*, Accessed Sep. 29, 2005, 2 pgs.

How to Cut Mat Products 2001, *Urschel Corp.*, Accessed online at fr.urschel.com/literature/HTCMeat.pdf on Oct. 3, 2005, 8 pgs.

Definitions of "comminute" and "slurry", Dictionary.com; Accessed Sep. 20, 2005, 2 pgs.

Voytik-Harbin et al., "Identification of Extractable Growth Factors from Small Intestinal Submucosa", *Journal of Cellular Biochemistry*, vol. 67, 1997, pp. 478-491.

McPherson, Ph.D. et al., "Characterization of Fibronectin Derived from Porcine Small Intestinal Submucosa", *Tissue Engineering*, vol. 4. No. 1, 1998, pp. 75-83.

Hodde, et al., "Vascular Endothelial Growth Factor in Porcine-Derived Extracellular Matrix", *Endothelium*, vol. 8(1), 2001, pp. 11-24.

Hodde et al., "Wounds: A Compendium of Clinical Research and Practice", *Website*: http:www.hmpcommunications.com/WNDS, Printed: Jul. 12, 2005, 7 pgs.

Hurst et al., "Mapping of the distribution of significant proteins and proteoglycans in small intestinal submucosa by fluorescence microscopy", *J. Biomater. Sci. Polymer Edn.*, vol. 12, No. 11, 2001, pp. 1267-1279.

Hodde et al., "Fibronectin peptides mediate HMEC adhesion to porcine-derived extracellular matrix", *Biomaterials*, vol. 23, 2002, pp. 1841-1848.

Hodde, "Naturally Occuring Scaffolds for Soft Tissue Repair and Regeneration", *Tissue Engineering*, vol. 8, No. 2, 2002, pp. 295-308.

Allman et al., Xenogeneic Extracellular Matrix Grafts Elicit a Th2-Restricted Immune Response, *Transplantation*, vol. 71, No. 11, Jun. 15, 2001, pp. 1631-1640.

Allman et al., "The Th2-Restricted Immune Response to Xenogeneic Small Intestinal Submucosa Does Not Influence Systemic Protective Immunity to Viral and Bacterial Pathogens", *Tissue Engineering*, vol. 8, No. 1, 2002, pp. 53-62.

Salem et al., "Interactions of 3T3 fibroblasts and endothelial with defined pore ffeatures", *J. Biomed Materials Res.*, vol. 61, No. 2, 2002, pp. 212-217.

Hiles et al., "Mechanical properties of xenogeneic small-intestinal submucosa when used as an aortic graft in the dog", *Journal of Biomedical Materials Research*, vol. 29, 883-891, (1995).

Sandusky, et al., "Healing Comparison of Small Intestine Submucosa and ePTFE Grafts in the Canine Carotid Artery", *J. Surg.Res.*, 58:415-420, (1995).

Knapp, et al., "Biocompatibility of Small-Intestine Submucosa in Urinary Tract as Augmentation Cystoplasty Graft and Injectable Suspension", *J Endourology*, 8:125-130, (1994).

Kropp et al., "Regenerative Bladder Augmentation: A Review of the Initial Preclinical Studies with Porcine Small Intestinal Submucosa", *Muscle, Matrix, and Bladder Function*, Plenum Press, New York, (1995).

Kropp et al., "Experimental Assessment of Small Intestinal Submucosa as a Bladder Wall Substitute", *Urology* 446:396-400, (1995).

Vaught et al., "Detrusor Regeneration in the Rat Using Porcine Small Intestinal Submucosa Grafts: Functional Innervation and Receptor Expression", *J. Urol.*, 155:374-378, (1996).

Kropp et al, Characterization of Small Intestinal Submucosa Regenerated Canine Detrusor: Assessment of Reinnervation, In Vitro Compliance and contractility, *J. of Urol*, 156:599-607, (1996).

Kropp et al., "Regenerative Urinary Bladder Augmentation Using Small Intestinal Submucosa: Urodynamic and Histopathologic Assessment in Long-Term Canine Bladder Augmentations", *Journal of Urology*, 155:2098-2104, (1996).

Aiken et al., "Small Intestinal Submucosa as an Intra-Articular Ligamentous Graft Materials: A Pilot Study in Dogs", *Vet Comp Orthopedics Traumatology*, 7:124-128, (1994).

Badylak et al., "The use of Xenogeneic Small Intestinal Submucosa as a Biomaterial for Achille's Tendon Repair in a dog model", *J Biomed Materials*, 29:977-985, (1995).

Hodde et al., "The Effect of Range of Motion Upon Remodeling of Small Intestinal Submucosa (SIS) when used as an Achilles Tendon Repair Material in the Rabbit", *Tissue Engineering* 3, 1:27-37, (1997).

Ferrand et al., "Directional Porosity of Porcine Small-Intestinal Submucosa", *J Biomed Materials Res*, 27:1235-1241, (1993).

Hiles et al., "Porosity of Porcine Small-Intestinal Submucosa for use as a Vascular Graft", *J Biomed Materials Res*, 27: 139-144, (1993).

Hodde et al., "Glycosaminoglycan Content of Small Intestinal Submucosa: A Bioscaffold for Tissue Replacement", *Tissue Engineering*, 2:3, 209-217, (1996).

Prevel et al., "Small Intestinal Submucosa: Utilization for Repair of Rodent Abdominal Wall Defects", *Ann Plast Surg*, 35:374-380, (1995).

Clarke et al., "Intestine Submucosa and Polypropylene Mesh for Abdominal Wall Repair in Dogs", *J Surg Res*, 60:107-114, (1996).

Prevel et al., "Small Intestinal Submucosa: Utilization as a Wound Dressing in Full-Thickness Rodent Wounds", *Ann Plast Surg.* 35:381-388, (1995).

Cobb et al., "Histology after Dural Grafting with Small Intestinal Submucosa", *Surgical Neurology*, 46: 389-394, (1996).

Cobb et al., "Porcine Small Intestinal Submucosa as a Dural Substitute", *Surgical Neurology*, 51:99-104, (1999).

Voytik-Harbin et al., "Application and Evaluation of the AlamarBlue Assay for Cell Growth and Survival of Fibroblasts", *Journal of Immunological Methods, In Vitro Cell Bio-Animal*, 34: 2399-246, (1998).

Suckow, M.A., "Enhanced Bone Regeneration Using Porcine Small Intestinal Submucosa", *J. Invest Surg*, 12: 277, (1999).

Badylak, S., et al., "Naturally Occurring Extracellular Matrix as a Scaffold for Musculoskeletal Repair", *Clin Orthop*, 3675:S333-S3433, (1999).

Cook, J.L. et al., "Induction of Meniscal Regeneration in Dogs Using a Novel Biomaterial", *Am J Sports Med*, 27: 658, (1999).

Dejardin, L.M. et al., "Use of small intestinal submucosal implants for regeneration of large defects: an experimental study in dogs", J Biomed Mater Res, 46:203-211, (1999).

Sacks, M.S., et al., "Quantification of the fiber architecture and biaxial mechanical behavior of porcine intestinal submucosa", *J Biomed Mater Res*, 46:1-10, (1999).

COOK® News Releases, "COOK® Introduces Innovative Surgisis™ Soft Tissue Repair Biomaterial", (May 21, 2000).

COOK® News Releases, "COOK® Oasis™ Wound Dressing Biomaterial From COOK® Remodels Partial Thickness Skin Injuries", (Dec. 23, 1999).

COOK® News Releases, "Cook Incorporated Forms Dedicated Tissue Engineered Products Group", (Feb. 16, 2000).

COOK® News Releases, "FDA Clears Oasis™ Wound Dressing Biomaterial From COOK® For Full-Thickness Skin Injuries", (Jan. 24, 2000).

Klootwyk, et al., "The Use of Xenographic SIS as a Biomaterial for Achilles Tendon Repair in Dogs," First SIS Symposium, Dec. 1996, USA.

Lenz, et al., "SIS as an ACL Replacement in Dogs and Goats," First Symposium, Dec. 1996, USA.

Cook, et al., "Comparison of SIS Cancellous Bone as Substrates for Three-Dimensional Culture of Canine Articular Chondrocytes," First SIS Symposium, Dec. 1996, USA.

Badylak, et al., "Different Configurations of Small Intestinal Submucosa as a Biomaterial for Achilles Tendon Repair in a Dog Model," First SIS Symposium, Dec. 1996, USA.

Voytik-Harbin & Badylak, "Induction of Osteogenic Activity By Small Intestinal Submucosa in Rat Calvaria Non-union Defects," First SIS Symposium, Dec. 1996, USA.

Kandel, et al., "SIS and Reconstituted Cartilage and Its Use in Joint Resurfacing of Focal Defects in Rabbits," First SIS Symposium, Dec. 1996, USA.

Tullius, et al., "Differential Permeabilty of SIS," First SIS Symposium, Dec. 1996, USA.

Obermiller, et al., "Suture Retention Strength of SIS," First SIS Symposium, Dec. 1996, USA.

Shelton, et al., "Repair of the Canine Medial Meniscus using SIS: A Feasibility Study," Second SIS Symposium, Dec. 1998, USA.

Cook, et al., "Meniscal Regeneration in dogs Using Grafts of SIS," Second SIS Symposium, Dec. 1998, USA.

Welch, et al., "Healing of Canine Meniscal Defect with Small Intestinal Submucosa Implants," Dec. 1998, USA.

Solchaga, et al., "SIS as Delivery Vehicle for Mesenchymal Progenitor Cells," Dec. 1998, USA.
Paulino, et al., "The Use of an SIS-PGA Composite Graft for Repair of Cartilage Defect," Dec. 1998, USA.
Toombs and May, "Clinical Follow-Up of Three Canine ACL Reconstructions Using an SIS ACL Device," Dec. 1998, USA.
Tomasek and Gifford, "Small Intestinal Submucosa Matrix Regulates The Differentiation of Myofibroblasts," Third SIS Symposium, Nov. 2000, USA.
Cook, et al., "Tissue Engineering For Meniscal Repair Using SIS," Third SIS Symposium, Nov. 2000, USA.
Lifrak, et al., "Enhanced Repair of Goat Meniscal Defects Using Porcine Small Intestinal Submucosa (SIS)," Third SIS Symposium, Nov. 2000, USA.
Hoffman, "SIS Disc Replacement For the Temporomandibular Joint," Third SIS Symposium, Nov. 2000, USA.
Kaeding, "Use of SIS In The Surgical Treatment of Chronic Symptomatic Patella Tendinosis," Third SIS Symposium, Nov. 2000, USA.
Tomczak and Kaeding, "Use of SIS in The Surgical Treatment of Tendinosis About The Foot And Ankle," Third SIS Symposium, Nov. 2000, USA.
Moore, et al., "Bridging Segmental Defects In Long Bones With Intramedullary Tubes And Periosteal Sleeves Made From Small Intestinal Submucosa (SIS)," Third SIS Symposium, Nov. 2000, USA.
Wang, et al., "Small Intestinal Submucosa Enhances Healing of Medical Collateral Ligament In A Rabbit Model," Third SIS Symposium, Nov. 2000, USA.
Ojha, et al., "PGA-Plla Versus Small Intestinal Submucosa (SIS): A Comparison of Neo-Cartilage Grown From Two Scaffold Materials," Third SIS Symposium, Nov. 2000, USA.
Wiklerson, "Use of The Porcine Small Intestine Submucosal Tissue Graft And Repair of Rotator Cuff Tears," Third SIS Symposium, Nov. 2000, USA.
"Small Intestinal Submucosa," Third SIS Symposium, Nov. 2000, USA.
"Current Clinical Applications of SIS," Third SIS Symposium, Nov. 2000, USA.
Hodde, et al., "Glycosaminoglycan Content of Small Intestinal Submucosa: A Potential for GAG-Growth Interactions in SIS-Mediated Healing", First Symposium, Dec. 1996, USA.
Friess, "Collagen in drug delivery and tissue engineering", Advanced Drug Delivery Reviews, vol. 55, No. 12, 2003, pp. 1529-1530.
Olsen et al., "Recombinant collagen and gelatin for drug delivery", Advanced Drug Delivery Reviews, vol. 55, No. 12, 2003, pp. 1547-1567.
Aigner et al., "Collagen-major component of the physiological cartilage matrix, major target of cartilage degeneration, major tool in cartilage repair", Advanced Drug Delivery Review, vol. 55, No. 12, 2003, pp. 1569-1593.
Geiger et al., "Collagen sponges for bone regeneration with rhBMP-2", Advanced Drug Delivery Reviews, vol. 55, No. 12, 2003, pp. 1613-1629.
Ruszczak et al., "Collagen as a carrier for on-site delivery of antibacterial drugs", Advanced Drug Delivery Reviews, vol. 55, No. 12, 2003, pp. 1679-1698.
O'Grady et al., "Global regulatory registration requirements for collagen-based combination products: points to consider", Advanced Drug Delivery Reviews, vol. 55, No. 12, 2003, pp. 1699-1721.
Matthews et al., "Electrospinning of Collagen Type II: A Feasibility Study", Journal of Bioactive and Compatible Polymers, vol. 18, Mar. 2003, pp. 125-134.
Biscarini et al., "Growth of High Vacuum Sublimed Oligomer Thin Films", ACS Polymer Preprints, vol. 37, No. 2, 1996, pp. 618-619.
Biscarini et al., "Morphology and roughness of high-vacuum sublimed oligomer thin films", Thin Solid Films, vol. 439-443, 1996, pp. 284-285.
Biscarini et al., "Scalling Behavior of Anistropic Organic Thin Films Grown in High-Vacuum", Physical Review Letters, vol. 78, No. 12, Mar. 24, 1997, pp. 2389-2392.
Krčma, "Nonwoven Textiles", Textile Trade Press, Manchester, England, 1962, 6 pgs.
Answers.com,. Definition of "freeze-dry", Accessed on May 12, 2005, 6 pgs.
Ma et al., "Microtubular architecture of biodegradable polymer scaffolds", J. Biomed. Materials Res., vol. 56, No. 4, 2001, pp. 469-477.
Ma et al., "Biodegradable Polymer Scaffolds with Well-Defined Interconnected Spherical Pore Network", Tissue Engineering, vol. 7, No. 1, 2001, pp. 23-33.
Klawitter et al., "An Evaluation of Bone Growth into Porous High Density Polyethylene", J. Biomed. Materials Res., vol. 10, (1976) pp. 311-323.
White et al., "Biomaterial Aspects of Interpore-200 Porous Hydroxyapatite", Dental Clinics of North America, Reconstructive Implant Surgery and Implant Prosthodontics 1, vol. 30, No. 1, pp. 49-67, Jan. 1986.
Shors, Coralline Bone Graft Substitutes, Orthopaedic Clinics of North America, Bone Grafting and Bone Graft Substitutes, vol. 30, No. 4, Oct. 1999, pp. 599-613.
Wang, Experimental Study of Osteogenic Activity of Sintered Hydroxyapatite—On the Relationship of Sintering Temperature and Pore Size—, J. Jpn. Orthop. Assoc., vol. 64, 1990, pp. 847-859.
Nehrer et al., "Matrix collagen type and pore size influence behavior of seeded canine chondrocytes", Biomaterials, vol. 18, No. 11, 1997, pp. 769-776.
Supplementary European Search Report, Appln No. 02753403.1 (PCT/US 223190) dated Dec. 21, 2006 (3 pages).
Definitions of "intertwine" and "twine." American Heritage Dictionary of the English Language Online. Accessed Sep. 29, 2005. 2 pages.
On-line Medical Dictionary definition of "extracellular matrix" located at http://cancerweb.ncl.ac.uk/cgibin/omd?extracellular+matrix.
Siegel et al., "Meniscal allografts", Clin Sports Med., 1993, 12(1), pp. 59-80.
Klompmaker et al., "Meniscal replacement using a porous polymer prosthesis: a preliminary study in the dog", Biomaterials, 1996, 17(12), pp. 1169-1175.
de Groot et al., "Use of porous polyurethanes for meniscal reconstruction and meniscal protheses", Biomaterials, 1996, 17(2), pp. 163-173.
Spaans et al., "Solvent-free fabrication of micro-porous polyurethane amide and polyurethane-urea scaffolds for repair and replacement of the knee-joint meniscus", Biomaterials, 2000, 21(23), pp. 2453-2460.
Stone et al., "Regeneration of meniscal cartilage with use of a collagen scaffold—Analysis of Preliminary data", J Bone Joint Surg. Am., 1997, 79(12), pp. 1770-1777.
Rodkey et al., "A clinical study of collagen meniscus implants to restore the injured meniscus", Clin. Orthop., 1999, 49(367 Suppl.), pp. S281-292.
Merriam-Webster Online Dictionary definitions of "suspension", "suspend", "cohesive", "comminute", "pulverize", "submucosa", and "tissue". Accessed Mar. 30, 2006, 9 pgs.
Resin Technology Group, LLC, "Viscosity chart", http://www.resintechgroup.com/tables/viscosity.html, accessed online Mar. 30, 2006, 1 pg.
Definitions from Onelook.com for "trimethylen" and "trimethylene", Mar. 17, 2006.

* cited by examiner

METHOD FOR ORGANIZING THE ASSEMBLY OF COLLAGEN FIBERS AND COMPOSITIONS FORMED THEREFROM

FIELD OF THE INVENTION

The present invention relates to biomaterials and a method for preparing the biomaterials, particularly a biocompatible polymer useful for supporting cell and tissue proliferation and regeneration.

BACKGROUND OF THE INVENTION

There are various approaches that can be used to fabricate protein polymeric materials. One approach involves modifying the primary structure or nanostructure of a protein using mutagenesis or a suitable genetic engineering means. The changes in the nanostructure of the protein can ultimately affect protein folding and assembly. For example, crosslinkers may be added to the nanostructure of a protein such that random covalent bridges are formed between adjacent parts of the protein to form a polymeric matrix. Another approach involves modifying the assembling process of the macrostructure of a protein to improve the cohesiveness and strength of the protein polymers. Proteins that have been the targets for macrostructure manipulation include those that are capable of self assembling. For example, Collagen has been known to self assemble to form a protein scaffold that can be used to structurally support cell or tissue proliferation, and various techniques for fabricating Collagen scaffolds have been disclosed. However, the known techniques for assembling collagen scaffolds typically yield scaffolds that are composed of randomly arranged fibers. These scaffolds may lack desirable characteristics, such as fiber strength. These characteristics are important, especially in biomedical applications.

Therefore, there is a need to control the process of protein assembly in a manner that provides for an arrangement of protein fibers that promotes the structural strength of the protein matrixes or the scaffolds. There is also a need for strong protein polymers that can be used to support cell or tissue proliferation and regeneration.

SUMMARY

The method for preparing a biomaterial in accordance with the present disclosure comprises one or more of the following features or combinations thereof:

A method for preparing a protein polymer material involves applying a form of energy such as electrical energy, gravitational energy, thermal energy, or chemical energy to a protein to cause the protein to assemble in a controlled arrangement to form a protein polymer material. The protein used in this method may be any suitable fibrillar protein capable of self assembling. For example, collagen Type I or collagen Type II may be used as the starting material. The protein may be in a solution that has an acidic pH, and may contain a buffer.

In an exemplary embodiment, the method of the present invention utilizes an electric field as the source of the energy to affect the protein assembly. In this embodiment, the protein is placed in an electric field that has a field density sufficient to affect the directionality of the protein fiber orientation. In one embodiment a field density of between about $1.23 \times 10^{-8}$ Joules/m$^3$ and about $1.11 \times 10^{-6}$ Joules/m$^3$ is used. A protein polymer fabricated within such an electric field will have its component fibers arranged in the same direction as the direction of the electric field.

In another specific embodiment, the electric field direction may be altered during the protein fabrication process such that the protein fibers that have not been assembled, at the time the electric field is altered, change their orientation and subsequently assemble in accordance with the new orientation. This change of the electric field direction affects the change in the pattern of the protein elongation. In other words, the pattern of the protein elongation can be controlled by changing the direction of the electric field.

In an alternative embodiment, an electric current, instead of an electric field, is used to manipulate the direction of the protein elongation. The protein may be placed in contact with and between two electrodes. Up to 50 mA current may be generated to flow between the two electrodes, causing the protein to elongate in the direction of the current. Similar to the electric field, the direction of the current may be altered so that the direction of the elongation of the protein is changed as desired.

In another alternative embodiment, a centrifugal force may be applied to the self-assembling protein under vacuum to influence the protein fiber elongation. About 10,000 to up to 100,000×g can be used for this purpose.

In another aspect of the invention, the protein may be fabricated in free space or on a surface that is provided during protein assembly. More particularly, the protein may be attached to the surface to form a coating, and in one embodiment the surface is part of a medical device, wherein the medical device is be made of a metal, an alloy, an organic polymer, an inorganic material, or a combination thereof.

The protein polymer material produced by the method described herein has an organized fiber arrangement which affects the structure and strength of the polymer material. The material may be used as protein scaffolds or a coating of a medical device. The medical devices that have the present protein polymer coating have advantages in better supporting the cell and tissue proliferation, regeneration and differentiation.

Additional features of the present disclosure will become apparent to those skilled in the art upon consideration of the following detailed description of embodiments exemplifying the best mode of carrying out the subject matter of the disclosure as presently perceived.

DETAILED DESCRIPTION OF THE INVENTION

Definitions

Figure 1:
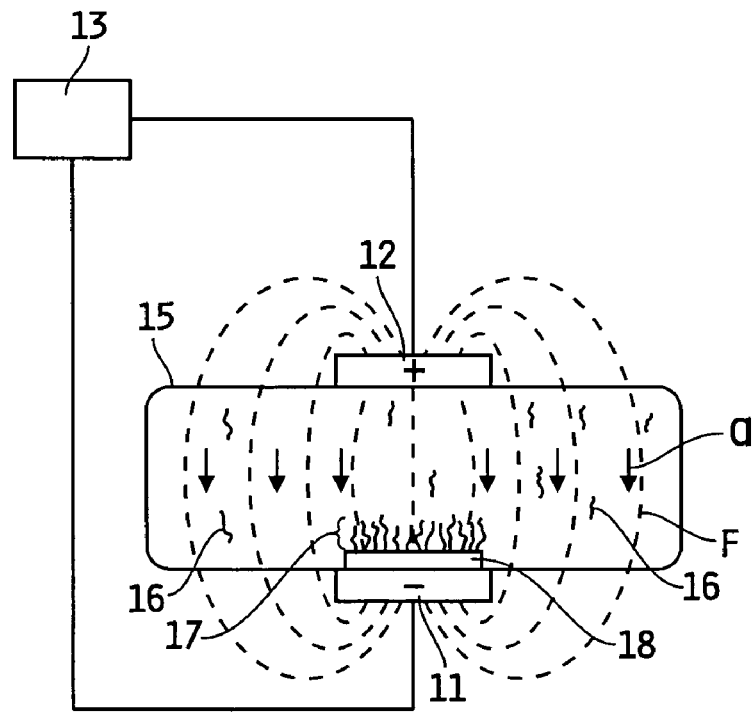
FIG. 1 is a diagrammatic representation of an electric field treatment of a protein solution showing the effect of the electric field on the protein assembly.

In describing and claiming the invention, the following terminology will be used in accordance with the definitions set forth below.

A used herein the term "bioactive agents" include one or more of the following: chemotactic agents; therapeutic agents (e.g. antibiotics, steroidal and non-steroidal analgesics and anti-inflammatories, anti-rejection agents such as immunosuppressants and anti-cancer drugs); various proteins (e.g. short chain peptides, bone morphogenic proteins, glycoprotein and lipoprotein); cell attachment mediators; biologically active ligands; integrin binding sequence; ligands; various growth and/or differentiation agents (e.g. epidermal growth factor, IGF-I, IGF-II, TGF-β I-III, growth and differentiation factors, vascular endothelial growth factors, fibroblast growth factors, platelet derived growth factors, insulin derived growth factor and transforming growth factors, parathyroid hormone, parathyroid hormone related peptide, bFGF; TGFβ superfamily factors; BMP-2; BMP-4; BMP-6; BMP-12; sonic hedgehog; GDF5; GDF6; GDF8; PDGF); small molecules that affect the upregulation of specific growth factors; tenascin-C; hyaluronic acid; chondroitin sulfate; fibronectin; decorin; thromboelastin; thrombin-derived peptides; heparin-binding domains; heparin; heparan sulfate; DNA fragments and DNA plasmids.

As used herein the term "polymer matrix" refers to a three dimensional mass of polymeric subunits.

As used herein the term "collagen-based matrix" refers to polymer matrices that comprise collagen fibers. The term encompasses both naturally occurring extracellular matrices and/or reconstituted collagen matrices.

As used herein the term "naturally occurring extracellular matrix" comprises any non-cellular material naturally secreted by cells (such as intestinal submucosa) isolated in their native configuration with or without naturally associated cells.

As used herein the term "submucosal matrices" refers to natural extracellular matrices, known to be effective for tissue remodeling, that have been isolated in their native configuration, including submucosa derived from intestinal tissue (autograft, allograft, and xenograft), stomach tissue (autograft, allograft, and xenograft), bladder tissue (autograft, allograft, and xenograft), alimentary tissue (autograft, allograft, and xenograft), respiratory tissue (autograft, allograft, and xenograft) and genital tissue (autograft, allograft, and xenograft), and derivatives of liver tissue (autograft, allograft, and xenograft), including for example liver basement membrane.

As used herein the phrase "in the presence of an electrical force" encompasses providing, producing or transmitting electricity, or providing or producing an electrical charge, in sufficient proximity to a substrate or chemical reaction/self assembly to effect the physical properties of the substrate, reagents or product of the chemical reaction/self assembly. For example an electrical force may include subjecting the substrate or chemical reaction to an electric current or placing the substrate or chemical reaction within an electrical field.

As used herein the term "electric field density" relates to the electrical energy produced by a charged object. The strength of the electric field is dependent upon how charged the object creating the field is and upon the distance of separation from the charged object. For example the electrical energy stored between two plates of a capacitor is defined by the formula:

$$u=(E_o V^2)/2d^2$$

where $E_o$ is the permittivity constant which is $8.85 \times 10^{12}$ Farads/m, V is the voltage and d is the distance between the positive and the negative charged plates.

As used herein the term "ordered protein matrix" refers to a matrix wherein the component fibers of the matrix were assembled in one or more predefined direction in a homogenous manner.

As used herein the term "exogenous" or "exogenously added" designates the addition of a new component to a composition, or the supplementation of an existing component already present in the composition, using material from a source external to the composition.

EMBODIMENTS

The typical process of self assembling of a protein involves protein molecules or fibers joining together randomly to form a protein polymer. The randomly arranged fibers in the resulting protein polymer may provide insufficient mechanical strength for certain biomedical applications. As disclosed herein a method is provided for assembling polymer matrices wherein the component polymer fibers are ordered so that the resulting protein polymer has a predefined fiber arrangement and directionality.

The ordered polymer complexes disclosed herein are prepared in accordance with one embodiment of the present invention by applying an energy such as electrical energy or gravitational energy to affect the orientation of the monomer fibers that form the resulting polymer complex. These types of energy may also be combined with chemical energy or thermal energy to enhance the assembling process.

In accordance with one embodiment electrical energy is used to organize large molecules including synthetic polymers such as polylactic acid, polypropylene oxide, etc., into arrays that are then stabilized by hydrogen bonding, covalent linkages, ionic or hydrophobic/hydrophilic interactions. In one embodiment the polymers for use in accordance with the present disclosure are selected from those that exhibit surface charges or dipole moments, especially those with an amphiphatic nature. Such polymers are anticipated to be responsive to electric fields or electric currents. Once the polymers are ordered through the application of an electric force the ordered array is held together by interactions between the polymers themselves or by the addition of a crosslinking agent.

In accordance with one embodiment the polymer used to form the ordered polymer complexes of the present disclosure is a protein. More particularly, in one embodiment the protein used as the starting material in the present method may be any suitable fibrillar protein capable of self assembling. For example, collagen Type I (Col I) and collagen Type II (Col II) are linear proteins, the assembly of which provides a protein matrix that can be used in biomedical applications. It is contemplated that the proteins that have predominantly α-helix or β-sheet structure or a combination thereof are suitable for the manipulation using the present method. However, globular proteins such as elastin or collagen Type V may not be as organized as the linear proteins.

Suitable collagen materials used for fabricating protein polymers or protein matrixes may be derived from any sources, as known in the art. For example, Col I may be isolated from tendon, bone, skin, sub-mucosa tissue, and Col II may be isolated from cartilage. Currently, there are a number of known methods for isolating Col I or Col II from the tissue sources.

In accordance with one embodiment the collagen used in the presently disclosed method is isolated from natural materials that have a high collagen content, including naturally occurring extracellular matrices. In one embodiment the method for preparing a composition comprising a high content of collagen fibers comprises the steps of extracting collagen type I protein from a naturally occurring extracellular matrix, including for example submucosal tissue, through the use of an acidic reagent selected from the group consisting of acetic acid, citric acid, or formic acid. In one embodiment the extraction is conducted without the use of detergents or enzymes. In accordance with one embodiment the starting material is extracted using acetic acid at a pH of about 2 to about 4, and the temperature is kept below 20° C. during the extraction procedure.

In accordance with one embodiment the starting material is comminuted by tearing, cutting, grinding, shearing and the like to enhance the extraction of the collagen type I protein from the starting material. The starting material can be comminuted in the presence of the acidic reagent, or the material can be first comminuted and then contacted with the acidic reagent.

In accordance with one embodiment collagen type I fibers are isolated by homogenizing a naturally occurring extracellular matrix in the presence of about 0.1 to about 1.0 M acetic acid, and in one embodiment 0.5 M acetic acid, while the temperature of the homogenate is maintained below 20° C., and typically the homogenate temperature is kept near 4° C., through out the extraction process. In accordance with one embodiment the starting tissue is subjected to repeated cycles of homogenization in the presence of the acidic reagent, wherein the homogenate is placed on ice in between the homogenization steps.

The collagen comprising fraction is recovered by removing the insoluble fractions, typically by centrifugation and recovery of the supernatant. In accordance with one embodiment the extracted starting material is subjected to centrifugation at about 3000×g and the supernatant is recovered. However, other separation techniques such as filtration, and other techniques known to the skill practitioner, can be used in accordance with the present invention to recover the soluble fraction. In one embodiment collagen is isolated from a naturally occurring extracellular matrix, including extracellular matrices isolated from mammalian intestine, stomach, bladder, alimentary, respiratory, and genital submucosa. See, e.g., U.S. Pat. Nos. 4,902,508, 6,171,344, 6,099,567, and 5,554,389, the disclosures of which are hereby incorporated by reference. In one embodiment the collagen is isolated from intestinal submucosa, and in one embodiment the layer comprises small intestinal submucosa of a warm blooded vertebrate. In one embodiment, the material comprises the tunica submucosa along with the lamina muscularis mucosa and the stratum compactum of a segment of intestine, said layers being delaminated from the tunica muscularis and the luminal portion of the tunica mucosa of said segment. Such a material is referred to herein as intestinal submucosa (SIS)." In accordance with one embodiment of the present invention the intestinal submucosa comprises the tunica submucosa along with basilar portions of the tunica mucosa of a segment of intestinal tissue of a warm-blooded vertebrate. While swine SIS is widely used, it will be appreciated that intestinal submucosa may be obtained from other animal sources, including cattle, sheep, and other warm-blooded mammals. The preparation of SIS from a segment of small intestine is detailed in U.S. Pat. No. 4,902,508, the disclosure of which is expressly incorporated herein by reference.

The isolated collagen material should be recovered and optionally stored in a buffered solution to control for pH. The pH of the solution may be adjusted so that the charge of the collagen type I molecules are as desired. For example, if the pH of the solution is adjusted to an acidic or a low pH, the collagen type I molecule will display a positive charge, in a solution with a high pH, the collagen type I molecule will display a negative charge. The concentration of the collagen molecules in the solution may vary. In one embodiment the collagen concentration used ranges from about 0.1 to about 1.3 mg of Col I/ml of solution, although a higher concentrations are also anticipated to be suitable for use in the presently described method. If the concentration of collagen is high, the resulting polymer is anticipated to exhibit a higher density.

In accordance with one embodiment a method is provided for preparing a polymer matrix from large molecules, typically from polymers that exhibit surface charges or dipole moments, especially those with an amphiphatic nature. In one embodiment the polymer matrix is prepared from self assembling collagen fibers. In one embodiment the method comprises the steps of inducing the assembly of the polymer matrix in the presence of an electrical force, causing the protein to assemble in a predefined direction to form an ordered protein polymer material. More particularly, in one embodiment collagen type I fibers are allowed to assemble while being subjected to and electrical field. The electrical field is placed within sufficient proximity of the self assembling collagen fibers so as to influence their orientation in the resulting matrix.

In one embodiment a solution of collagen is placed between two plates of a capacitor, and the two capacitor plates are charge, respectively, with opposite charges. The collagen solution is then allowed to self assemble using standard techniques known to those skilled in the art and including incubating at a permissive temperature (i.e. about 20° C. to about 40° C.), raising the pH, or adding salts. In one embodiment self-assembly of the collagen matrix is permitted and encouraged by raising the temperature of the collagen solution to above 20° C., but below 40° C., and in one embodiment raising the temperature to about 34° C. to about 38° C. In one embodiment self assembly is induced by raising the temperature of the collagen extract to about 37° C.

In accordance with one embodiment self assembly is further encouraged by the addition of small amounts of salts, such as ammonium sulfate solution, sodium phosphate solution, phosphate buffered saline (PBS) solution and NaCl solution or a combination thereof. The addition of small amounts of salts speeds the formation of the collagenous matrix without significantly impacting the desirable properties of the formed matrix. In accordance with one embodiment the salt is ammonium sulfate or sodium phosphate or a combination of the two. Typically, ammonium sulfate or sodium phosphate is added to the collagen extract in a final concentration of about 0.1 mM to about 100 mM. In one embodiment the salt used is ammonium sulfate, and in one particular embodiment ammonium sulfate is added to a final concentration of about 0.3 mM to about 90 mM. In one embodiment ammonium sulfate is added to a final concentration of about 3.0 mM to about 30 mM.

FIG. 1 provides one example of how the electric field treatment may be set up and performed. As illustrated, a protein solution is placed in covered container 15, positioned between electrodes 11 and 12. Electrodes 11 and 12 are connected to power supply 13 and function together as a capacitor. When the power is turned on, electrode 11 becomes negatively charged, and electrode 12 becomes positively charged. Electric field (F) is created between the two electrodes and spans through the protein solution in container 15 in the direction represented by arrow a. The protein solution is kept at room temperature (20-25° C.) for 1-5 hours or longer. During this time, protein molecules 16, influenced by electric field (F) are oriented substantially vertically along the direction of electric field (F). Assembly is promoted by the addition of a salt, or by increasing temperature to about 30° C. to about 40° C., and in one embodiment raising the temperature to about 35° C. to about 38° C. A salt solution is optionally added to the protein solution during this incubation period to induce/catalyze self assembling of the matrix. In one embodiment the salt solution comprises $(NH4)_2SO_4$ at a concentration of 0.0003 M to 0.3 M. In addition, the entire assembly, including container 15 under electric field (F), may be moved to a 37° C. incubator to enhance protein self assembly. The protein solution is continued to be incubated under the electric field for another 8 to 12 hours. During this period, an ordered protein polymer matrix 17 is formed.

In one embodiment the matrix is formed in the presence of a substrate and the matrix is bound or coated onto the surface of the substrate. For example, as shown in FIG. 1, the formation of matrix 17 may occur on disk 18 that is provided at the bottom of container 15 above electrode 11. Alternatively, protein polymer matrix 17 may form in free space in the solution, if disk 18 is not provided. Protein polymer matrix 17 will have protein molecules 16 arranged substantially vertically relative to disk 18, in an organized manner. The polymer matrix 17 that is formed either on disk 18 or in free space may be harvested and freeze dried under vacuum. The dry product may be used in various biomedical applications. It is contemplated that in place of disk 18, other passivated porous surfaces of a plate or device of a biomedical application may also be used to receive the protein deposit. Disk 18 or the surfaces of a device to be coated may be made of any suitable material(s), such as a metal, a metal alloy, an inorganic polymer, or a ceramic material. In one embodiment an ordered protein matrix is deposited on a Kirshner wire, forming a coating on the surface of the wire.

In one embodiment, the protein solution is treated with an electric field that has a density of at least about $7.38 \times 10^{-8}$ Joule/$m^3$. In one embodiment a collagen solution is subjected to an electrical field density of about $7.38 \times 10^{-8}$ Joule/$m^3$ to about $1.106 \times 10^{-6}$ Joules/$m^3$ while being placed under conditions conducive for collagen self assembly. Even higher electric field density than $1.106 \times 10^{-6}$ Joules/$m^3$ are expected to be effective. It is possible to adjust the electric field density by varying the voltage and the distance between the charged electrodes using the following formula:

$$u = (E_o V^2)/2d^2$$

where $E_o$ is the permittivity constant which is $8.85 \times 10^{12}$ Farads/m, V is the voltage and d is the distance between the positive and the negative charged plates. A potential of 15V or more may be applied across the plates with d=6 or 3 cm at room temperature. An example of the electric field treatment is described in Example 1.

Figure 2:
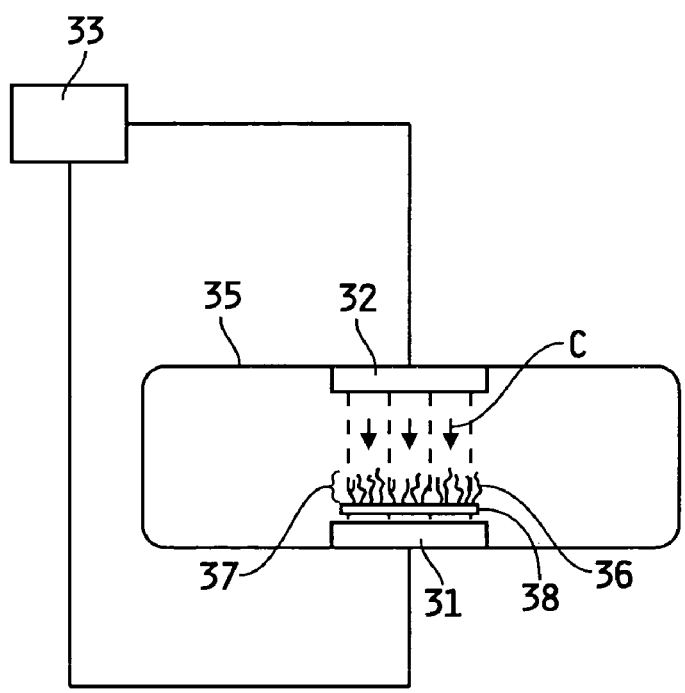
FIG. 2 is a diagrammatic representation of an electric current treatment of a protein solution showing the effect of the electric current on the protein assembly.

In an alternative embodiment, the method of using an electrical force to form an ordered polymer matrix comprises the use of energy in the form of electric current. The electric current treatment may be set up in a similar manner as previously discussed for the electric field treatment, however in this embodiment the electrodes are placed in electrical contact with the monomer comprising solution. In one embodiment the application of electric current is performed in the absence of any other entropic agents, such as thermal or chemical energy. As illustrated in FIG. 2, in one embodiment a protein solution is placed in covered container 35. Electrodes 31 and 32 are placed inside container 35 and in contact with the protein solution. Disk 38 is provided in the bottom of container 35 for receiving the protein fibers. Electrodes 31 and 32 are connected to power supply 33. When the power is turned on, current flows from power supply 35 to electrode 32, then through the protein solution to electrode 31. Protein fibers 36, influenced by the electric current, precipitate onto disk 38 in a substantially vertical orientation to form a protein polymer. About 50 mA or less can be used to fabricate the protein polymer. In accordance with one embodiment the current used is selected from a range of about 5 to about 50 mA. The treatment time may be from one hour or more, depending on the current used. If a very low current (less than 10 mA) is used, it will take longer to complete the fabrication of the protein.

Figure 3:
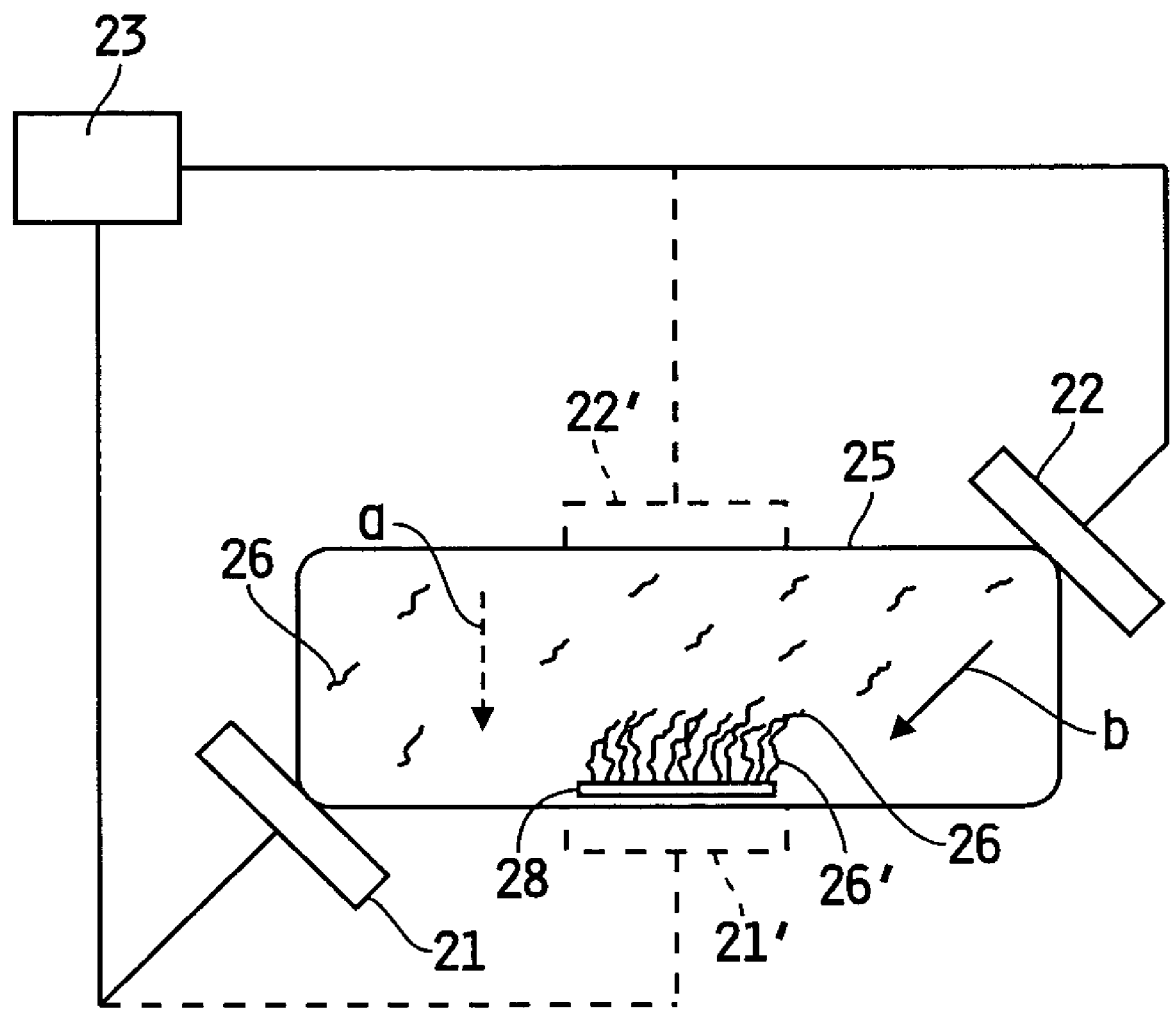
FIG. 3 is a diagrammatic representation of an electric field treatment of a protein solution showing the effect of the change of the electric field direction on the change of the pattern of the protein fibers.

In one specific embodiment, the protein polymer may be influenced to assemble in such a way that the protein fibers elongate in predefined multiple-directions. As illustrated in FIG. 3, a protein solution is placed in covered container 25, first positioned between electrodes 21' and 22'. Electrodes 21' and 22' are connected to power supply 23. When the power is turned on, electrode 21' becomes negatively charged, and electrode 22' becomes positively charged. The electric field is created between the two electrodes and spans through the protein solution in container 25 in the direction represented by arrow a. Subsequently the protein is induced to deposit on disk 28 as above-described. The process of the protein disposition on disk 28 may be halted, while the electrodes are moved to new positions (or alternatively a second set of electrodes at a different position relative to the first set is activated while the first set is deactivated) as shown by electrodes 21 and 22 in FIG. 3. A new electric field is created, and the direction of the electric field is changed to the direction represented by arrow b. Protein fibers 26 are deposited on the already deposited fibers 26', creating a second fiber orientation. It is contemplated that the electrodes may be repositioned as often as desired, until all the protein fibers in the solution are deposited. It is also possible to use multiple electrodes that can be charged or uncharged as desired to manipulate the electric field direction. Similarly, the protein fibers can be assemble in a controlled multiple orientation through the use of electric currents, wherein the position of the electrodes is altered during the assembly process.

Alternatively, the method of the present invention may utilize centrifugal force to control the fiber arrangement of the protein polymer. The protein solution may be placed in a centrifuge tube and centrifuged at a low atmospheric pressure, i.e. in a vacuum. The force needed is between 10,000 and 50,000×g. It is contemplated that even lower g force than the 10,000×g may be effective. With the lower force (below 10,000×g), it may be necessary to keep the centrifugation at a temperature of about 37° C., and under vacuum. However, if the force is applied at one atmospheric pressure, the force may be increased to 100,000×g. A specific example of the use of the centrifugal force is described in Example 3.

EXAMPLE 1

Alignment of Collagen Fibers Through the Use of an Electrical Field

A solution of Col I protein (SISH solution) was prepared from swine intestinal submucosa (SIS). The SISH solution has Col I protein concentration of about 0.1 to about 1.2 mg/ml. A 5 ml SISH solution was poured into a 3 cm Petri dish and covered. The Petri dish was placed in a chamber with two electrodes, one above and one below. The electrodes were not in contact with the SISH solution contained within the Petri dish. A metal disk was placed inside the covered Petri dish in a manner that places the SISH solution in intimate contact with the metal disk, and positions the disk right above the bottom electrode, separated by the bottom surface of the Petri dish. When the power supply was turned on, an electric field density of $1.23 \times 10^{-8}$ to about $1.106 \times 10^{-6}$ Joules/m$^3$ was created across the protein solution. After 1-5 hours at room temperature (20-25° C.), about 0.01% to about 10% of a 3M ammonium sulfate, $(NH_4)_2SO_4$ solution was added to the SISH solution through a hole on the top of the plate, to make the final $(NH4)_2SO_4$ concentration of 0.0003 M to 0.3 M. The addition of the salt solution was made while the SISH solution continued to be exposed to the electric field. The SISH solution plate was incubated at a temperature of 37° C., while still under the electric field for about 2 to about 12 hours or overnight.

At the end of the electric field treatment, a gel-like substance was recovered from the metal plate. The thickness of the gel varied based on the amount of $(NH4)_2SO_4$ added to the SISH solution. The gel-like material was freeze-dried under vacuum, at –70° C. The resulting protein material was observed using scanning electron microscopy (SEM) and its structural composition was determined using Fourier Transfer infrared spectroscopy (FTIR) using attenuated total reflectance (ATR). It was observed that the protein fibers appeared to be arranged in a vertical orientation, in the same direction as the electric field, and their α-helical content was higher than 90%, but decreased with increasing salt concentration.

EXAMPLE 2

Alignment of Collagen Fibers Through the Use of an Electrical Current

A solution of Col I protein (SISH solution), at a concentration of about 0.1 to about 1.2 mg/ml, was poured into a Petri dish and covered. One electrode was placed at the bottom of the plate and another electrode was placed at the top of the plate. Both electrodes were in contact with the protein solution. A disk was provided at the bottom of the plate above the bottom electrode. The distance between the electrodes varied from about 0.5 cm to about 1.0 cm. The electrodes were connected to a power supply, set at between about 10 and 50 mA. The current was flowing from the top electrode to the bottom electrode. The set up was incubated at room temperature for about one hour. During the one hour period, the deposition was immediately apparent and could be corroborated by Fourier transform infrared spectroscopy (FTIR). It was observed that the higher the current, the faster the protein deposition was. The protein on the disk was collected and freeze-dried following the procedure described in Example 1.

EXAMPLE 3

Alignment of Collagen Fibers Through the Use of Centrifugal Force

A 1 ml solution of Col I protein (SISH solution), at a concentration of about 0.1 to about 1.2 mg/ml, was poured into a centrifuge tube. The tube was placed in a centrifuge (Rotovac). The centrifugation was performed under vacuum at a force of between 10,000 to about 100,000×g, for about 60 minutes. If metal pins were provided along the long axis of the tube the protein would form a dry but glassy coating on the pins. The resulting protein polymer appeared as a thin glassy film on the pins. The alpha helical content of such coatings was higher than 95%, which indicated native folding of the molecule.

Using a combination of the various forms of energy described herein above, at discrete times, it is possible to create assemblies of protein with predetermined external shapes and internal architectures. These resulting polymers or the coated device could be stand-alone devices or components of more complex but completely biomimetic orthopaedic medical devices. Crosslinking and deposition of biomimetic hydroxyapatite coatings on some of these will significantly increase their stiffness while vectorial concentration gradients will be instrumental in controlling sheer and permeability properties.

It is further contemplated that the present invention will be useful in the fabrication of completely biomimetic resurfacing elements for joint replacements for the younger and healthier patients. It would be composed of a hard calcified but porous Collagen underlinement supporting a softer Collagen matrix for fibrous tissue regeneration. After a while the new tissues that form in these scaffolds may or may not be the same as the native tissue, they only have to be able to bear the loads and adapt by reaching steady states capable of coping with the challenges of the environment which translates into painless functionality for the patient. Ideally and in the absence severe systemic or chronic conditions, the joint system will balance its regeneration around a suitable steady state and our future materials will be the catalyst of this process.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A method for preparing a polymer matrix, comprising: providing a composition comprising a monomer; and
assembling a polymer matrix from the monomer in the presence of an electrical field having an electric field density of at least $7.38 \times 10^{-8}$ Joule/m$^3$, wherein the monomer composition is placed between two plates of a capacitor and the capacitor plates are charged during the step of assembling the polymer matrix.

2. The method of claim 1, wherein the monomer composition comprises a fibrillar protein capable of self assembling.

3. The method of claim 2, wherein the fibrillar protein is collagen extracted from a naturally occurring extracellular matrix.

4. The method of claim 3 wherein the collagen is extracted from a submucosal matrix using acetic acid, in the absence of detergents or enzymes.

5. The method of claim 3 wherein the step of assembling the polymer matrix comprises incubating the monomer composition at a temperature ranging from about 20° C. to about 40° C.

6. The method of claim 5 further comprising the step of adding a solution comprising $(NH_4)_2SO_4$.

7. The method of claim 1 wherein the monomer composition comprises collagen fibers and the method further comprises:

providing a solid surface for the protein to assemble thereon; and assembling an organized collagen fiber coating on the surface.

8. A method for preparing a polymer matrix, comprising:
providing a composition comprising a monomer; and
assembling a polymer matrix from the monomer in the presence of an electrical current passing through the monomer composition, wherein the current ranges from about 5 to about 50 mA.

9. The method of claim 8, wherein the monomer composition comprises collagen extracted from a naturally occurring extracellular matrix.

10. The method of claim 9 wherein the collagen is extracted from a submucosal matrix using acetic acid, in the absence of detergents or enzymes.

11. The method of claim 10 wherein the step of assembling the polymer matrix comprises incubating the monomer composition at a temperature ranging from about 20° C. to about 40° C.

12. The method of claim 11 further comprising the step of adding a solution comprising $(NH_4)_2SO_4$.

13. A method for preparing a polymer matrix, comprising:
providing a composition comprising a monomer; and
assembling a polymer matrix from the monomer in the presence of an electrical force, wherein the step of assembling a polymer matrix from the monomer in the presence of an electrical force comprises:

generating a first electric field in an orientation that induces assembly of a first polymer fiber in a first direction;

terminating the first electric field; and generating a second electrical field in an orientation that induces assembly of a second polymer fiber in a second direction relative to the first polymer fiber.

14. A method for preparing a polymer matrix, comprising:
providing a composition comprising a monomer; and
assembling a polymer matrix from the monomer in the presence of an electrical force, wherein the step of assembling a polymer matrix from the monomer in the presence of an electrical force comprises:

generating a first electric current between a first set of two electrodes and through the monomer composition, wherein the first electric current induces the assembly of a first polymer fiber in a first direction;

terminating the first electrical current; and generating a second electric current between a second set of two electrodes and through the monomer composition, wherein the second electric current induces the assembly of a second polymer fiber in a second direction relative to the first polymer fiber.

* * * * *